United States Patent Office 2,919,596
Patented Jan. 5, 1960

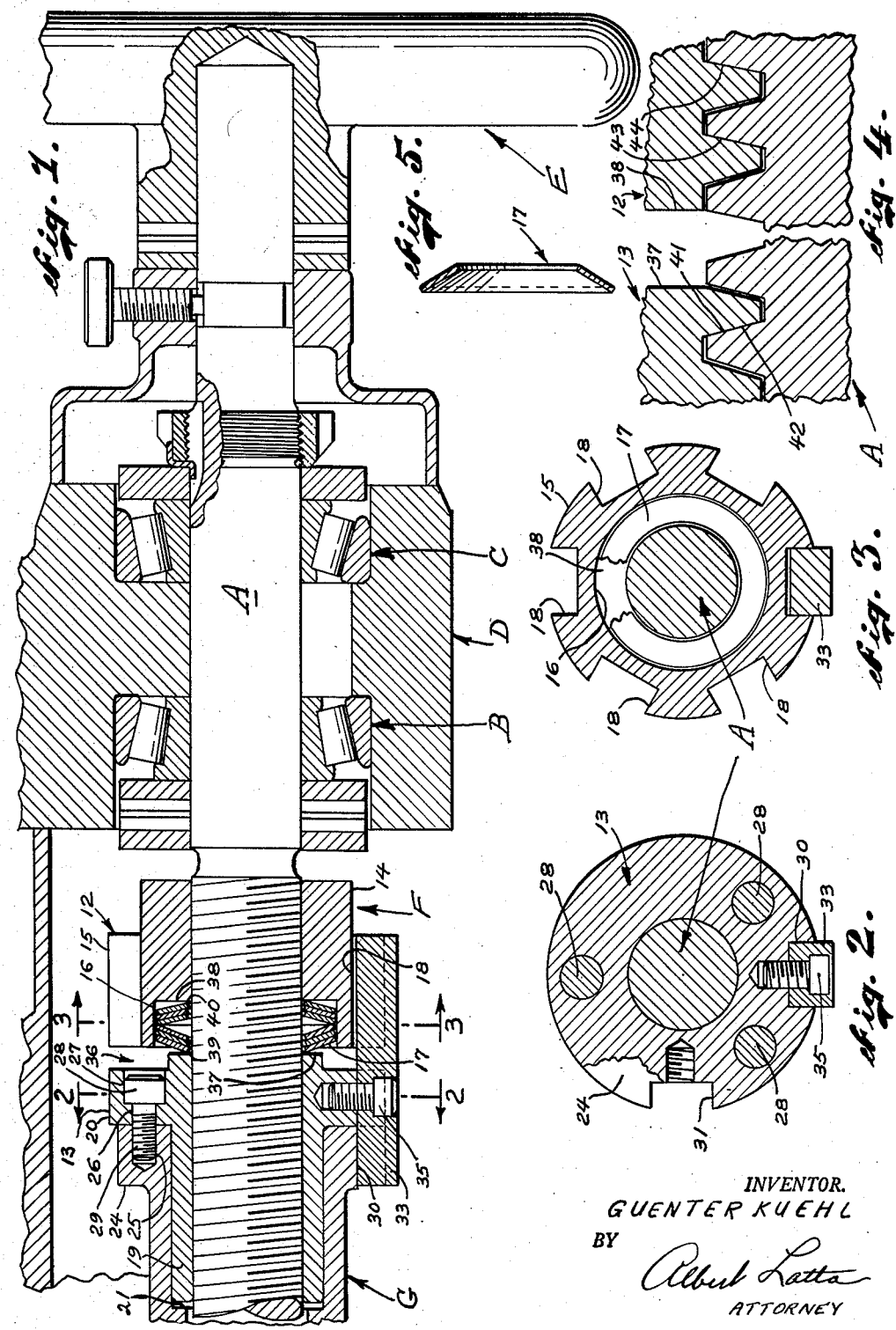

2,919,596

ANTI-BACKLASH NUT

Guenter Kuehl, Racine, Wis., assignor to George Gorton Machine Co., Racine, Wis., a corporation of Wisconsin Application February 24, 1958, Serial No. 716,931

1 Claim. (Cl. 74—441)

My invention relates to drives for tables of machine tools in which provision is made to avoid back lash normally encountered during a metal cutting operation.

The general object of my invention is to provide a so-called spring pre-loaded nut to overcome back lash during metal cutting operation.

More specifically, my invention provides a spring pre-loaded nut for a feed screw which takes up the slack which is occasioned by wear and tear on the threads of the feed screw. Still more specifically, my invention contemplates a spring pre-loaded nut having a station-to-station adjustment for setting the desired load on the spring washers in the nut to offset the load imposed by the cutting tool in operative engagement with the work.

The invention resides further in certain structural details hereinafter set forth and illustrated in the attached drawing, in which:

Figure 1 is a sectional view of a portion of a machine tool feed screw and associated mechanism with the back lash control device included.

Figure 2 is a sectional view taken on the line 2—2 of Figure 1.

Figure 3 is a sectional view taken on the line 3—3 of Figure 1.

Figure 4 is an enlarged fragmentary sectional detail view.

Figure 5 is a sectional detail view of one of the washers.

In general I have shown a portion of a machine tool feed screw A, one end of which is rotatably supported in suitable bearings B and C mounted in a wall D which forms part of the machine tool housing. I have shown a hand wheel E mounted at the end of the feed screw. The nut assembly F with which the feed screw is threadedly engaged may be removably secured to the end of a hollow piston rod G which is appropriately associated with the work table of the machine tool in a conventional manner (not shown). As the work table is being fed (during the metal cutting operation) by rotation of the feed screw, a load is imposed thereon through the internal threads of the nut assembly and back lash between feed screw and nut would normally be encountered except that the nut assembly is so constructed as to eliminate such back lash.

The anti-back lash device is threadedly engaged with the table feed screw A and is made up of two separate parts which are designated by the numerals 12 and 13. Each part may be referred to as nut element 12 and nut element 13.

The nut element 12 comprises an internally threaded hub portion 14 and an integral annular flange 15 of greater diameter than said hub 14. The nut 12 is internally threaded for engagement with table feed screw A and is counterbored at 16 to provide an annular recess of substantial diameter and depth to receive Bellville type spring washers 17 which nest within said recess. Spaced equally about the outer circumferential surface of flange 15 are axially directed slots 18.

The nut 13 comprises an annular flange 20 integral with an elongated tubular sleeve portion 19 which is internally threaded for threaded engagement with table feed screw A. The sleeve portion 19 is received within an enlarged counterbore 21 of the hollow piston rod G. The end 23 of said rod terminates with an enlarged flange 24 having spaced threaded apertures 25 which are aligned with apertures 26 in flange 20. These apertures 26 in each instance are counterbored at 27 for accommodating the heads 28 of fastening bolts 29. The nut 13 has two axially directed slots 30 and 31 in its circumferential surface, the width and depth of said slots corresponding to the width and depth of the slots 18 in nut 12. The key 33 is removably secured by means of bolt 35 in a slot 18 and as heretofore stated sets temporarily in one of the slots 30 or 31 in nut 13.

By temporarily removing the key 33 and rotating the nut 12 relative to the nut 13, a predetermined tension is imposed on the spring washers, the key then being replaced in one of the slots 18 and slots 30 or 31. By employing six equally spaced slots 18 in nut 12 and two slots in nut 13, a total range of 12 adjustment stations are obtained.

As the nut 12 is rotated relative to nut 13 the spring washers 17 are either expanded or contracted depending on the direction of rotation of nut 12. Assuming that added tension is desired, the nut 12 will be rotated so that it moves toward the nut 13 (reducing the gap 36 between the nuts). The spring washers are expanded (that is one set of the washers which are faced in one direction are squeezed toward the other set of washers which are faced in the opposite direction and as a result the gap between the end face 37 of nut 13 and the end wall 38 in counterbore 16 is reduced). The inner annular margin 39 of the outermost washer imposes thrust on the end face 37 of nut 12 and the inner annular margin 40 of the innermost washer imposes thrust on the end wall 38 of nut 12 in an axially opposite direction. Thus the forward faces 41 of the threads on the nut 13 are forced under tension against the rearward faces 42 of the threads on the feed screw A and the rearward faces 43 of the threads on the nut 12 are forced under tension against the forward faces 44 of the feed screw threads as illustrated in the fragmentary detail view of Fig. 4. Thus any back lash between the nut assembly and the feed screw is eliminated.

I have provided, herein, a simple device to effectively overcome so-called back lash which is easy to install and operate, very simple and cheap to manufacture and extremely efficient and practical for the purposes intended.

I claim:

The combination in an anti-back lash device, a table feed screw and a hollow piston rod, said device including two separate nut elements, one of said elements including an internally threaded hub and an integral annular flange of greater diameter than said hub, said first element internally threaded for engagement with said feed screw, said first element counterbored, sets of spring washers, each set of said washers opposed to each other and nested in said counterbore, six axially directed slots spaced equally about the annular flange of said first element, said other element having an annular flange and an elongated tubular sleeve, said sleeve internally threaded and engaged with said table screw, said piston rod counterbored, said sleeve mounted in said counterbore of said rod, said second element provided with two axially directed slots of substantially similar area to said slots in said first element, a key removably secured in either one of said slots in said second element, said first element rotatable relative to said second element, said spring washers expanded or contracted depending on the direction of rotation of said first element, a gap between said first and second elements in mounted position on said feed screw, the tension of said spring washers increased as said first element is rotated toward said second element and decreasing the gap between said elements, one set of said washers, when expanded, imposing thrust on said first element, the other set of washers, when expanded, imposing thrust on said second element with portions of the threads in said elements forced against the portions of said adjacent threads in said feed screw, the degree of tension imposed by said elements on said feed screw depending on the position of said key in said slots.

References Cited in the file of this patent

UNITED STATES PATENTS

| | | |
|---|---|---|
| 525,780 | Boynton | Sept. 11, 1894 |
| 2,447,439 | Thompson | Aug. 17, 1948 |
| 2,623,403 | Terdina | Dec. 30, 1952 |
| 2,690,682 | Passman | Oct. 5, 1954 |

FOREIGN PATENTS

| | | |
|---|---|---|
| 530,033 | Great Britain | Dec. 3, 1940 |
| 716,064 | Germany | July 15, 1942 |
| 1,061,282 | France | Apr. 12, 1954 |